United States Patent
Suppappola

(10) Patent No.: US 8,538,008 B2
(45) Date of Patent: Sep. 17, 2013

(54) ACOUSTIC ECHO CANCELER USING AN ACCELEROMETER

(75) Inventor: Seth Suppappola, Tempe, AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 844 days.

(21) Appl. No.: 12/313,622

(22) Filed: Nov. 21, 2008

(65) Prior Publication Data

US 2010/0128868 A1    May 27, 2010

(51) Int. Cl.
*H04M 9/08* (2006.01)
*A61F 11/06* (2006.01)

(52) U.S. Cl.
USPC ................................. 379/406.08; 381/71.11

(58) Field of Classification Search
USPC ....... 345/156; 379/406.01–406.14; 455/418; 704/215
See application file for complete search history.

(56) References Cited

U.S. PATENT DOCUMENTS

| | | | | |
|---|---|---|---|---|
| 4,180,706 A * | 12/1979 | Bakgaard | | 381/96 |
| 4,809,336 A | 2/1989 | Pritchard | | 381/61 |
| 5,117,401 A | 5/1992 | Feintuch | | 367/135 |
| 5,796,819 A * | 8/1998 | Romesburg | | 379/406.09 |
| 6,173,058 B1 * | 1/2001 | Takada | | 381/66 |
| 6,470,275 B1 | 10/2002 | Dubinsky | | 702/9 |
| 2002/0039414 A1* | 4/2002 | Nakai et al. | | 379/406.01 |
| 2003/0194097 A1* | 10/2003 | Ding | | 381/96 |
| 2004/0101153 A1* | 5/2004 | Grudin et al. | | 381/357 |
| 2004/0184623 A1* | 9/2004 | Johannsen et al. | | 381/117 |
| 2005/0201549 A1* | 9/2005 | Dedieu et al. | | 379/420.01 |
| 2006/0155346 A1 | 7/2006 | Miller | | 607/57 |
| 2007/0167671 A1 | 7/2007 | Miller | | 600/25 |
| 2008/0132750 A1 | 6/2008 | Miller | | 600/25 |
| 2010/0124336 A1* | 5/2010 | Shridhar et al. | | 381/71.4 |

* cited by examiner

*Primary Examiner* — Simon Sing
*Assistant Examiner* — Jeffrey Lytle
(74) *Attorney, Agent, or Firm* — Cahill Glazer PLC

(57) ABSTRACT

A system includes a loudspeaker, a microphone, an echo canceling circuit, and an accelerometer coupled to the loudspeaker for providing a reference signal, a(n), to the echo canceling circuit. Preferably, the accelerometer is attached to the loudspeaker. A speaker signal, x(n), is used to drive the loudspeaker and the system also includes a switch for coupling either a(n) or x(n) to the echo canceling circuit, depending upon the volume or loudness of the sounds involved.

4 Claims, 3 Drawing Sheets

ACOUSTIC ECHO CANCELER USING AN ACCELEROMETER

BACKGROUND OF THE INVENTION

This invention relates to acoustic echo cancellation and, in particular, to using an accelerometer to remove non-linearities caused by acoustic transducers.

The sound from a loudspeaker can be reflected or coupled back to a microphone after some finite delay, producing an echo. In its simplest form, the echo (sound) corresponds to the electrical signal in the apparatus producing the sound and the system is considered linear. Unfortunately, this is an ideal situation. Transducers, such as microphones and loudspeakers, are nonlinear, even when operated in their optimum range. This invention is described in the context of the acoustic echo in telephones but is more broadly useful.

Nonlinear effects significantly reduce the performance of acoustic echo cancelers, particularly in compact, hands-free kits for cellphones. Many of the problems associated with hands-free kits have been attributed to inexpensive, low-quality loudspeakers that are poorly isolated from the enclosure of a kit. When such a loudspeaker is overdriven, saturation effects associated with the loudspeaker and its amplifier distort sound in a nonlinear manner. An acoustic echo of such sound contains a mixture of linear and nonlinear components. A typical acoustic echo canceler estimates only the linear acoustic impulse response of the loudspeaker-enclosure-microphone system. The remaining nonlinear components can be large and audible, particularly at high volume.

An overdriven amplifier causes nonlinear distortion by creating harmonics and inter-modulation distortion from the clipping of large amplitude signals; see U.S. Pat. No. 4,809,336 (Pritchard). Enclosure vibration due to mechanical coupling between a loudspeaker and an enclosure, especially at lower voice frequencies, causes significant nonlinear distortion that is picked up by the microphone. The loudspeaker itself is a major source of nonlinear distortion. The nonlinearities can be acoustic, electromagnetic, or mechanical, such as distortion of the cone or diaphragm or the voice coil hitting an end of travel.

One can place a microphone next to a loudspeaker. This method is not very useful because new sounds and background noise are also picked up by the microphone. An optical sensor, such as a laser and photodetector, can be used to measure the displacement of the cone of a loudspeaker. This method requires sophisticated hardware when a much less expensive solution is desired.

Several other approaches have been used to cancel the nonlinear echo. One approach is nonlinear preprocessing of the signal to the loudspeaker. This method attempts to compensate for known nonlinear characteristics. Predistortion can degrade the quality of speech or loudness from a loudspeaker. Another approach is to use a nonlinear adaptive filter. Most or all known techniques have high computational cost and converge slowly, which makes them unsuitable for most real-time applications. Existing techniques for controlling non-linear echo use mathematical models of the nonlinearity. Echo canceler performance depends on the accuracy of the model. An accurate model can be very difficult to obtain because the non-linearities may change with time and may not be the same for two specimens of the same product.

Bulk delay is the time it takes an echo of the digital signal to a loudspeaker to be detected at a microphone. Synchronizing the microphone analog-to-digital conversion and the loudspeaker digital-to-analog conversion is challenging in real-time environments, especially if a non-real-time operating system is used.

It is known in the art to minimize the mechanical vibration picked up by a microphone using an accelerometer; U.S. Published Application Nos. 2006/0155346 (Miller), 2007/0167671 (Miller); and 2008/0132750 (Miller). U.S. Pat. No. 5,117,401 (Feintuch) discloses coupling a microphone or an accelerometer to a noise source for noise cancellation. U.S. Pat. No. 6,470,275 (Dubinsky) discloses using an accelerometer for noise cancellation in a device for drilling bore holes. U.S. Published Application No. 2005/0201549 (Dedieu et al.) discloses detecting the tilt angle and high frequency vibration of a loudspeaker using an accelerometer.

In view of the foregoing, it is therefore an object of the invention to generate a reference signal for echo cancellation from an accelerometer.

Another object of the invention is to provide an echo canceler that uses one adaptive filter for both the linear part of an echo and the nonlinear part of the echo.

A further object of the invention is to provide an echo canceler that measures, rather than estimates, the linear and nonlinear components of the response of a loudspeaker.

Another object of the invention is to provide an echo canceler that has a reference signal that is substantially insensitive to near-side speech and noise.

A further object of the invention is to provide an echo canceler that tracks time-varying changes in the response of a loudspeaker.

Another object of the invention is to provide an echo canceler that tolerates distortion by a loudspeaker, the amplifier driving the loudspeaker, or the enclosure for the loudspeaker.

A further object of the invention is to provide an echo canceler that measures all nonlinearities in the signal to a loudspeaker, including amplifier distortion, loudspeaker distortion, and case rattle.

Another object of the invention is to provide an echo canceler that uses the signal from an accelerometer rather than the signal to a loudspeaker as the reference signal for echo cancellation.

A further object of the invention is to provide an echo canceler that uses linear adaptive filtering to solve a nonlinear control problem, thereby reducing the number of processing cycles compared to using a nonlinear adaptive filter.

Another object of the invention is to provide an echo canceler that significantly reduces problems with bulk delay by generating a reference signal using an accelerometer coupled to a loudspeaker.

SUMMARY OF THE INVENTION

The foregoing objects are achieved in this invention in which a system includes a loudspeaker, a microphone, an echo canceling circuit, and an accelerometer coupled to the loudspeaker for providing a reference signal, a(n), to the echo canceling circuit. Preferably, the accelerometer is attached to the loudspeaker. A speaker signal, x(n), is used to drive the loudspeaker and the system also includes a switch for coupling either a(n) or x(n) to the echo canceling circuit.

BRIEF DESCRIPTION OF THE DRAWINGS

A more complete understanding of the invention can be obtained by considering the following detailed description in conjunction with the accompanying drawings, in which.

Those of skill in the art recognize that, once an analog signal is converted to digital form, all subsequent operations can take place in one or more suitably programmed microprocessors. Reference to "signal," for example, does not necessarily mean a hardware implementation or an analog signal. Data in memory, even a single bit, can be a signal. In other words, a block diagram can be interpreted as hardware, software, e.g. a flow chart or an algorithm, or a mixture of hardware and software. Programming a microprocessor is well within the ability of those of ordinary skill in the art, either individually or in groups.

DETAILED DESCRIPTION OF THE INVENTION

Figure 1:
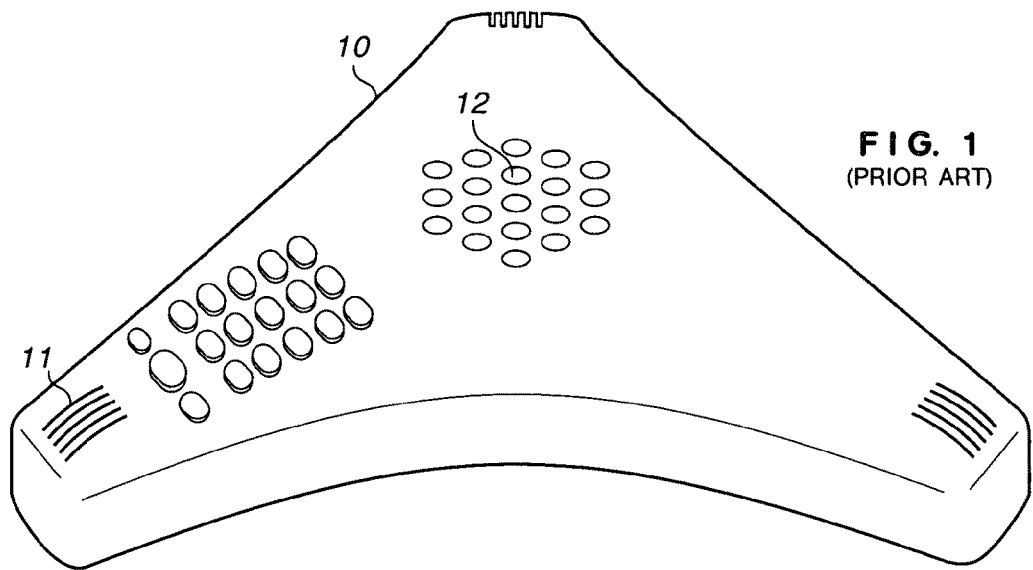
FIG. 1 is a perspective view of a speakerphone.
Figure 2:
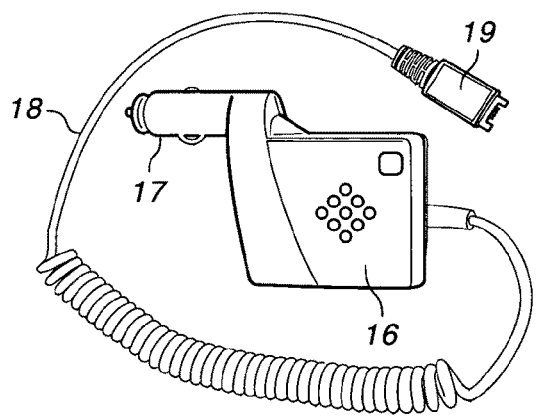
FIG. 2 is a perspective view of a hands-free kit.
Figure 3:
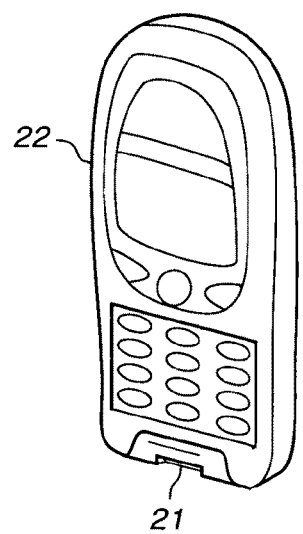
FIG. 3 is a perspective view of a cellphone.

FIG. 1 illustrates a conference phone or speaker phone such as found in business offices. Telephone 10 includes microphone 11 and loudspeaker 12 in a sculptured case. FIG. 2 illustrates what is known as a hands-free kit for providing audio coupling to a cellphone, illustrated in FIG. 3. Hands-free kits come in a variety of implementations but generally include powered loudspeaker 16 attached to plug 17, which fits an accessory outlet or a cigarette lighter socket in a vehicle. A hands-free kit also includes cable 18 terminating in plug 19. Plug 19 fits the headset socket on a cellphone, such as socket 21 (FIG. 3) in cellphone 22. Some kits use RF signals, like a cordless phone, to couple to a telephone. A hands-free kit also typically includes a volume control and some control switches, e.g. for going "off hook" to answer a call. A hands-free kit also typically includes a visor microphone (not shown) that plugs into the kit. Audio processing circuitry constructed in accordance with the invention can be included in a hands-free kit or in a cellphone.

Figure 4:
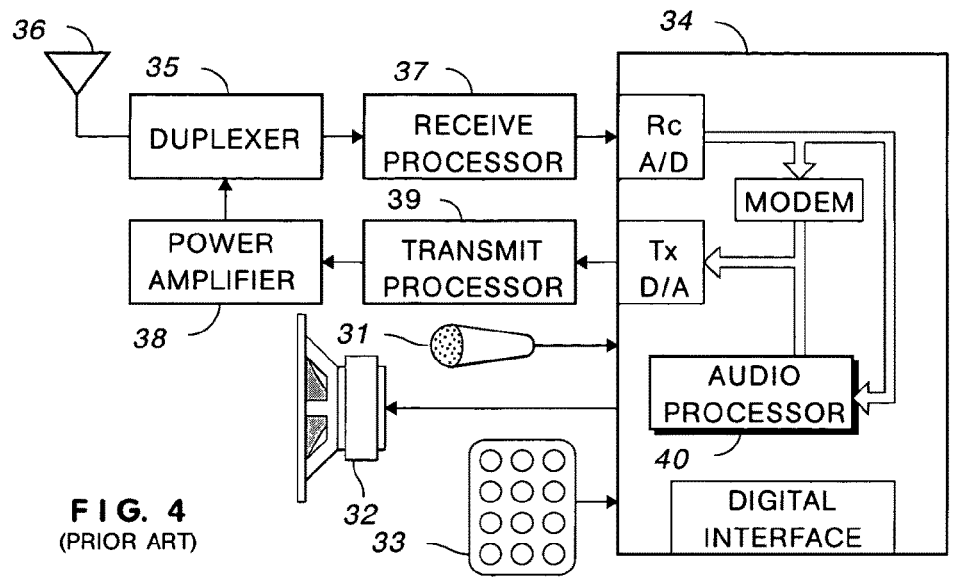
FIG. 4 is a block diagram of a cellphone.

FIG. 4 is a block diagram of the major components of a cellphone. Typically, the blocks correspond to integrated circuits implementing the indicated function. Microphone 31, loudspeaker 32, and keypad 33 are coupled to signal processing circuit 34.

A cellphone includes both audio frequency and radio frequency circuits. Duplexer 35 couples antenna 36 to receive processor 37. Duplexer 35 couples antenna 36 to power amplifier 38 and isolates receive processor 37 from the power amplifier during transmission. Transmit processor 39 modulates a radio frequency signal with an audio signal from circuit 34. In non-cellular applications, such as speakerphones, there are no radio frequency circuits and signal processor 34 may be simplified somewhat. Echo cancellation takes place in audio processor 40. It is audio processor 40 that is modified to include the invention.

Figure 5:
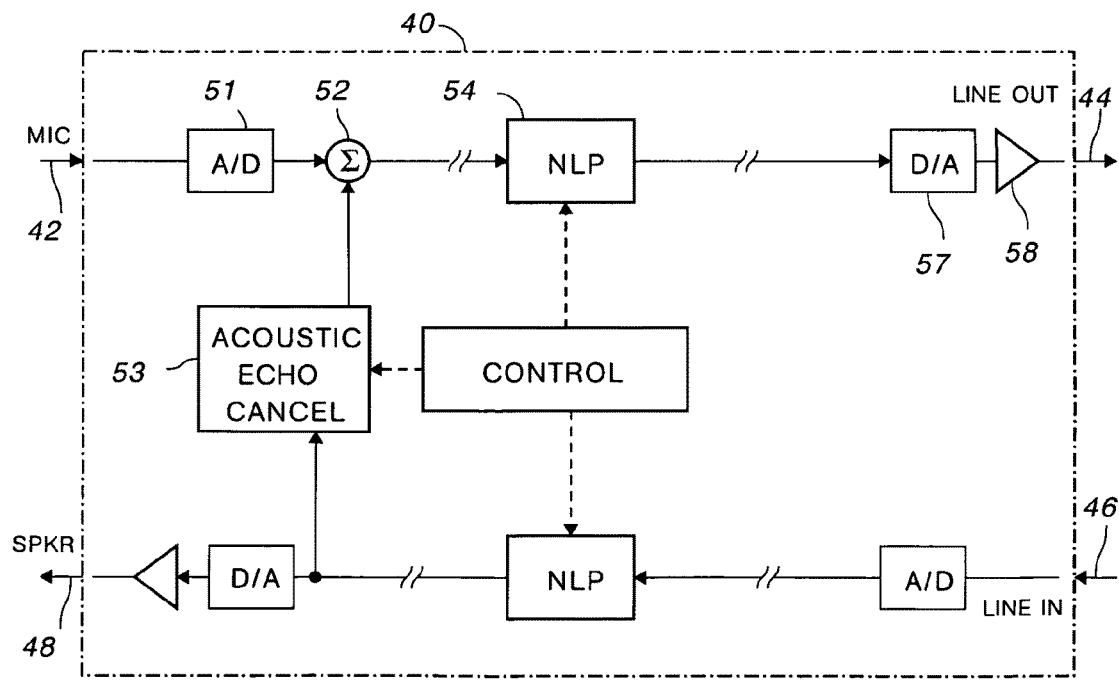
FIG. 5 is a block diagram of an audio processing circuit.

FIG. 5 is a more detailed block diagram of audio processor 40. The following describes signal flow through the transmit channel, from microphone input 42 to line out 44. The receive channel, from line in 46 to loudspeaker output 48, operates similarly.

The signal from input 42 is digitized in A/D converter 51 and coupled to summation circuit 52. There is, as yet, no signal from echo canceling circuit 53 and the data proceeds intact to non-linear processor 54. The output from non-linear processor 54 is coupled to D/A converter 57, amplified in amplifier 58, and coupled to line output 44. Circuit 53 reduces acoustic echo by providing a modified signal from the transmit channel to summation circuit 52.

Figure 6:
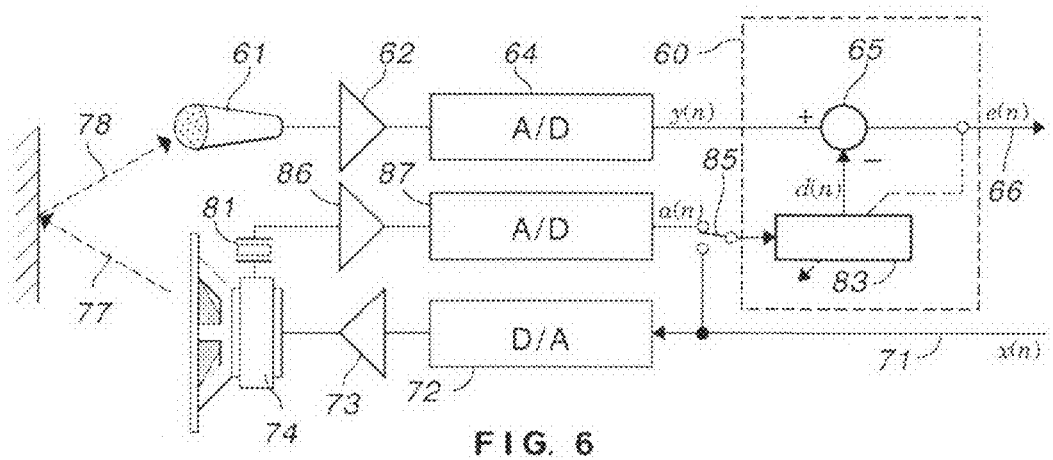
FIG. 6 is a block diagram of an echo canceler constructed in accordance with a preferred embodiment of the invention.

FIG. 6 illustrates a preferred embodiment of the invention. In FIG. 6, microphone 61 is coupled through amplifier 62 to analog to digital converter 64. The output signal from converter 64 is coupled through summation circuit 65 to output 66. The signal on output 66 is ultimately coupled to a "line out" terminal. Similarly, a signal on input 71, from a "line in" terminal, is processed and coupled to digital to analog converter 72. The signal in analog form is coupled through amplifier 73 to loudspeaker 74. As indicated by dashed lines 77 and 78, some of the sound from loudspeaker 77 is reflected back to microphone 61 as an echo.

A digital representation, y(n), of the signal from microphone 61 is coupled to a first input of summation circuit 65. The signal, y(n), contains two components, original sound and echo. The echo has portions that are linear and nonlinear. Original sound can include, for example, near-end speech and background noise. "Near-end" refers to one end of a two channel communication link between two parties to a telephone call. "Far end" refers to conditions on the telephone lines, including "line out" and "line in," and signals from the telephone of the other party.

For echo cancellation, an estimate, d(n), of the echo is coupled to a second input of summation circuit 65. If the estimate is accurate, the echo component is canceled and signal e(n) represents only original sound. As described thus far, the circuit is a substantially conventional, near-end, acoustic echo canceler as described in FIG. 5 when switch 85 is connected to input 71.

In accordance with one aspect of the invention, the vibrations of loudspeaker 74 are converted into an electrical signal by accelerometer 81, such as a piezoelectric crystal. This signal is amplified in amplifier 86 and digitized in converter 87, and used as reference signal a(n) for adaptive filter 83. Adaptive filter 83 is preferably what is known in the art as a finite impulse response (FIR) filter.

Signal a(n) is a reference signal to the adaptive filter 83 when switch 85 is in the position shown and includes any nonlinearities generated by loudspeaker 74 or amplifier 73. Adaptive filter 83 estimates the combined linear response of loudspeaker-enclosure-microphone system. The adaptive filter is required to model only the linear acoustic impulse response because the adaptive filter reference signal is the nonlinearly distorted signal. In a conventional acoustic echo canceler, an adaptive filter has to model both the nonlinear response and the linear response of the system and, typically, does not model the nonlinear responses.

The performance of echo canceler 60 has been measured in terms of echo return loss enhancement (ERLE), defined as $$ERLE(n) = \frac{E[y^2(n)]}{E[e^2(n)]}$$

where E is the statistical expectation. Experimental data was collected in a relatively quiet car. An eleven second speech signal was fed into a 50 mm×32 mm loudspeaker having a capacity of two watts. The echo signal was sensed by a 6 mm omnidirectional microphone. The speech file used consisted of 200 ms white noise followed by an artificial male voice at the far end (ITU-T Recommendation P.50). Sets of data were obtained at different sound pressure levels. The signals were recorded at 48 kHz sampling frequency with a 16-bit A/D converter and subsequently down-sampled to 16 kHz for analysis. A piezoelectric accelerometer weighing eight grams with dynamic range of ±150 g was mounted on the magnet of the loudspeaker to detect vibration as the loudspeaker reproduced the speech file. In one embodiment of the invention, the adaptive filter was implemented using a normalized least mean squares (NLMS) algorithm with 512 taps. The step size, μ, was set to 0.5 and regularization factor r was equal to $10^{-6}$.

Figure 7:
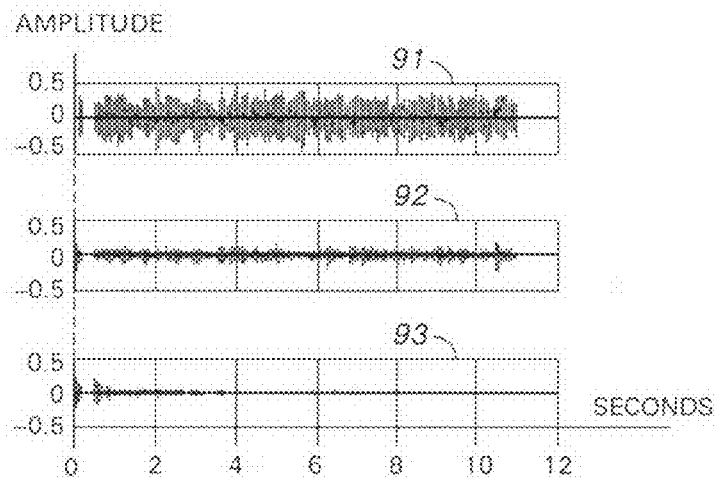
FIG. 7 is a series of charts illustrating the operation of the invention.

FIG. 7 includes three charts representative of the data collected. Chart 91 represents signal y(n). Chart 92 represents the output from summation circuit 65 when switch 85 is in the lower position; i.e. when x(n) is used for the estimate, as in the prior art. Chart 93 represents signal e(n) when a(n) provides the estimate.

Figure 8:
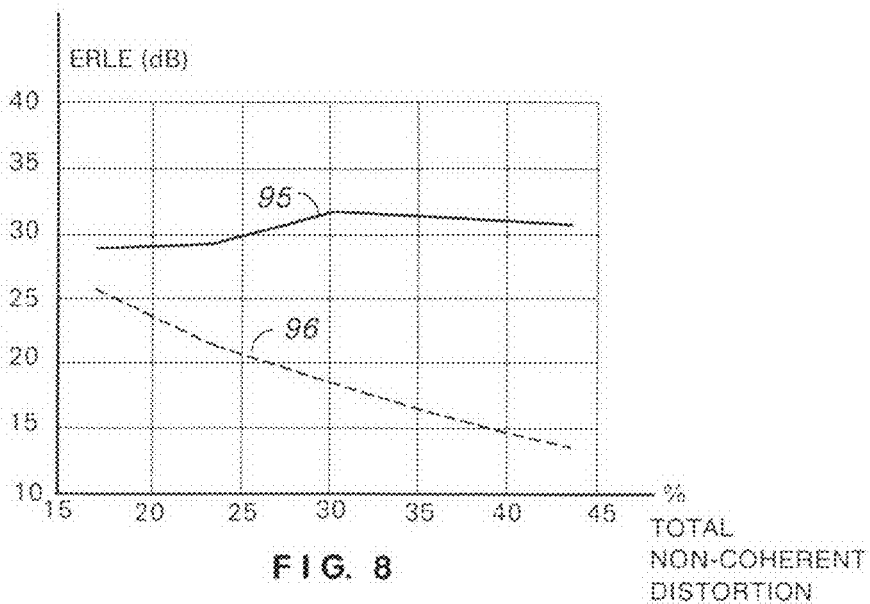
FIG. 8 is a chart illustrating echo return loss enhancement.

FIG. 8 is a chart of ERLE versus total non-coherent distortion. Curve 95 represents a(n) and remains almost flat as total non-coherent distortion increases. Curve 96 decreases very sharply with increasing total non-coherent distortion when the accelerometer is not used. At maximum distortion, representing a 40 dB increase in volume, using an accelerometer improves ERLE more than 15 dB. Although additional hardware is used to accommodate the accelerometer, the overall computational complexity is the same as for an acoustic echo canceler of the prior art that also uses an adaptive filter.

An accelerometer is insensitive to near-end speech and background noise. If a second microphone had been used instead of an accelerometer for detecting nonlinear distortion, near-end speech and noise would inevitably be included in reference signal a(n) and the acoustic echo canceler would attempt to cancel it. An accelerometer can be 50 dB less sensitive to near-end speech and noise than a microphone, yet just as sensitive to echo.

The invention thus provides an acoustic echo canceler using an accelerometer to generate a reference signal. An acoustic echo canceler constructed in accordance with the invention requires only one adaptive filter rather than a first filter for the linear part of the echo and a second filter for the nonlinear part of the echo. The canceler measures, rather than estimates, linear modifications to x(n), thereby reducing the estimation demand on the adaptive filter in an echo canceling circuit. The canceler uses linear adaptive filtering to solve a nonlinear control problem and does not require as many processing cycles as a nonlinear adaptive filter would require.

An acoustic echo canceler constructed in accordance with the invention is largely insensitive to near side speech and noise but is sensitive to time-varying nonlinearities of the loudspeaker and significantly reduces problems with bulk delay. An acoustic echo canceler constructed in accordance with the invention also enables less expensive loudspeakers to be used, loudspeaker volumes to be increased, and smaller loudspeakers to be used.

An acoustic echo canceler constructed in accordance with the invention measures all nonlinearities emanating from the loudspeaker, including amplifier distortion, loudspeaker distortion, and case rattle. The canceler does not predistort speaker signal, x(n), to minimize nonlinearities.

Having thus described the invention, it will be apparent to those of skill in the art that various modifications can be made within the scope of the invention. For example, one can use speaker signal, x(n), at low volumes, when the signal from the accelerometer may be too small, and the accelerometer signal, a(n), at high volumes. This allows good performance at any volume. Near-end speech and background noise cause slight mechanical vibration of the loudspeaker and its enclosure. At normal to high volume, this vibration is insignificant. At low volume, the vibration could become a noticeable fraction of the signal from accelerometer 81. When to switch is determined empirically and depends upon many factors, such as the loudspeaker, the enclosure, and the particular environment in which the system is located at the time. The accelerometer can be mounted on the enclosure of a hands-free system; for example, instead of on the loudspeaker itself. Whether circuit 65 is called a summation circuit, a subtraction circuit, or "combining means" does not matter. In an electronic computer, signals are subtracted using two's complement addition.

What is claimed as the invention is:

1. A system for reducing nonlinear echoes in an acoustic signal, the system comprising in combination:
    a) a loudspeaker for reproducing audio signals, the loudspeaker occasionally generating non-linear distortion signals;
    b) a signal processor having an output for providing an output audio signal to be reproduced by the loudspeaker, the signal processor also having a first input and a second input;
    c) a microphone for detecting speech by a user, the microphone being coupled to the first input of the signal processor;
    d) an accelerometer physically coupled to the loudspeaker for generating signals indicative of movement by the loudspeaker corresponding to non-linear distortion signals, the accelerometer being coupled to the second input of the signal processor;
    e) the signal processor including an adaptive filter for subtracting non-linear distortion signals presented by the accelerometer to the second input of the signal processor from audio signals presented by the microphone to the first input of the signal processor before providing the output audio signal to the loudspeaker.

2. The system for reducing nonlinear echoes as recited in claim 1 wherein the first adaptive filter generates a digital output signal, and wherein said signal processor includes a digital-to-analog converter for providing an analog signal to the loudspeaker.

3. The system for reducing nonlinear echoes as recited in claim 2 further including a switch coupled to the second input of the signal processor, the switch having at least a first state and a second state, the first state of the switch coupling the accelerometer to the second input of the signal processor for supplying non-linear distortion signals, and the second state of the switch coupling the digital output signal of the adaptive filter to the second input of the signal processor.

4. The system for reducing nonlinear echoes as recited in claim 3 wherein the adaptive filter used to reduce nonlinear echoes is also used to reduce linear echo signals.

* * * * *